(12) United States Patent
Umeda et al.

(10) Patent No.: US 7,352,673 B2
(45) Date of Patent: Apr. 1, 2008

(54) RECORDING METHOD AND RECORDING APPARATUS

(75) Inventors: Mariko Umeda, Fuchu (JP); Hiroyuki Minemura, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 576 days.

(21) Appl. No.: 10/931,039

(22) Filed: Sep. 1, 2004

(65) Prior Publication Data
US 2005/0207306 A1    Sep. 22, 2005

(30) Foreign Application Priority Data
Mar. 18, 2004    (JP) .............................. 2004-077407

(51) Int. Cl.
*G11B 7/00* (2006.01)

(52) U.S. Cl. .................................. 369/59.11

(58) Field of Classification Search ...................... None
See application file for complete search history.

(56) References Cited

U.S. PATENT DOCUMENTS 6,861,965 B2*  3/2005  Kayanuma et al. ........... 341/59
6,940,431 B2*  9/2005  Hayami ....................... 341/102
7,095,698 B2*  8/2006  Uchida ...................... 369/59.24
7,158,464 B2*  1/2007  Gushima et al. ......... 369/59.25
7,215,261 B2*  5/2007  Ushiyama et al. ............ 341/59
2002/0031073 A1  3/2002  Miyamoto

FOREIGN PATENT DOCUMENTS

JP          11-177431         7/1999
JP       P2002-197662 A      7/2002

OTHER PUBLICATIONS

Mishimal, et al. Optical Data Storage 2003, Michael O'Neill, Naoyasu Miyagawa, Editors, SPIE vol. 5069 (2003).

* cited by examiner

*Primary Examiner*—Wayne Young
*Assistant Examiner*—Adam R. Giesy
(74) *Attorney, Agent, or Firm*—Antonelli, Terry, Stout & Kraus, LLP.

(57) ABSTRACT

A recording method and apparatus reduces jitter and increases the number of possible rewrites in an optical disc. When the absolute values of DSV values calculated for different DCC bits are equal, the selection of the DCC bit is carried out in a random manner, so that a different signal is recorded in each case on an optical disc medium even when the same user data is recorded. As a result, the deterioration of the marks and spaces is made uniform and the number of possible rewrites is increased.

13 Claims, 11 Drawing Sheets

FIG. 2

| No | \|DSV\| THRESHOLD | PRIORITY SELECTION OF DCC BIT | DIFFERENCE IN DCC BIT (%) | DIFFERENCE IN DATA STRING (%) | DIFFERENCE IN EDGE POSITION (%) | NOTES |
|---|---|---|---|---|---|---|
| 1 | 0 | 0 | – | – | – | PRIOR ART |
| 2 | 0 | 1 | 27.0 | 49.6 | 0.7 | INVENTION |
| 3 | 10 | 0 | 29.0 | 48.2 | 0.8 | |
| 4 | 10 | 1 | 46.2 | 49.8 | 1.3 | |
| 5 | 20 | 0 | 38.1 | 49.9 | 1 | |
| 6 | 20 | 1 | 52.5 | 50.3 | 1.5 | |
| 7 | 50 | 0 | 41.3 | 49.5 | 1.1 | |
| 8 | 50 | 1 | 54.9 | 50 | 1.5 | |

In the case of i=496, (496/8)=62 bytes data can be used for the Key Data which consists of 30-byte Key Data and 32-byte ECC.

RECORDING METHOD AND RECORDING APPARATUS

CLAIM OF PRIORITY

The present application claims priority from Japanese application JP 2004-077407 filed on Mar. 18, 2004, the content of which is hereby incorporated by reference into this application.

BACKGROUND OF THE INVENTION

1. Field of the Invention

The present invention relates to a recording method and apparatus for recording information on an optical disc by forming a recoding mark with a different physical property from other portions on the recording medium.

2. Background Art

Optical discs such as DVD-RAM and DVD-RW that employ rewritable phase-change optical recording materials are now commonly available. Given the social needs, such as the recent growth of the Internet communities and the increase in the volume of information that must be handled, it is necessary to further increase the number of times information can be written over. In particular, in the management region for the management of directory information and defects, rewrites repeatedly take place at the same location, making the region more prone to deterioration. Deterioration is caused by various reasons. One of them, a contamination phenomenon, will be described below. When a phase-change optical recording material is melted in order to form a mark, diffusion of substances between the recording film and the adjacent protective film material, namely the contamination phenomena, occurs. As the refractive index of the recording film is altered by the contamination phenomena, resulting in a change in the strength of the reproduction signal and a reduction of the quality thereof. In the management region of the optical disc media, renewal of information is in many cases a part of a block, such that rewrites take place with substantially identical information. When the recorded information is identical, the locations of marks and spaces are constant within a margin of error due to uneven rotation, for example. In this case, if the reflectivity of only the mark portions decreases due to the contamination phenomena, the deterioration of data quality would be extremely pronounced.

In order to increase the number of rewrites that can be performed, JP Patent Publication (Kokai) No. 2002-197662 A discloses a technology involving polarity reversal, for example, in DVD-RAM, whereby the marks and spaces are randomly reversed in each rewrite such that the influence of the contamination phenomena can be made as uniform as possible. The RLL (2, 10) modulation (8-16 modulation) used in DVD is a technique for converting user data into edge positions. The modulation technique is thus an edge recording method, so that there is no change in the edge information no matter whether the pattern recorded on the disc is a mark (amorphous) or a space (crystalline). In DVD-RAM, utilizing the property of the 8-16 modulation and the fact that the data region is divided into sectors, a mark or a space is randomly allocated in the head pattern in each sector, thereby preventing only a mark (or a space) from being recorded at a specific location. This is referred to as a polarity reversal method, whereby 100,000 or more rewrites can be performed.

[Patent Document 1] JP Patent Publication (Kokai) No. 2002-197662 A

SUMMARY OF THE INVENTION

As mentioned above, the contamination phenomena can be effectively made uniform by the polarity reversal technique. Meanwhile, with the advancement of technologies, the development of next-generation high-capacity optical discs utilizing blue laser as the light source are in progress toward applications as high-definition recording media. The technology utilizes the RLL (1, 7) modulation (17PP modulation), as described in Optical Data Storage 2003 (SPIE Volume 5069), pp. 90-97, "Inorganic Write-Once Disc with Quadruple Recording Layers", where the regions are not discontinuous in each sector, as in DVD-RAM. As the CDs have evolved over the years from the days when they were intended for music purposes to the CD-ROM and CD-R for data applications, it is obvious that the next-generation large-capacity optical discs utilizing blue laser as the light source will move on from those for image recording purposes to those for data applications. As they do so, an increase in the number of possible rewrites, particularly in the management region, is indispensable. However, no techniques have been proposed so far for increasing the number of possible rewrites in the next-generation large-capacity optical discs using blue laser as the light source, analogous to the aforementioned polarity reversal technique.

It is therefore an object of the invention to provide a technique for increasing the number of possible rewrites in particularly the next-generation large-capacity optical discs.

When a signal recorded in an optical disc medium is reproduced, the voltage level in the edge portion of a mark and a space in a reproduction signal should preferably be stabilized. For this purpose, the reproduction signal outputted from the optical head is supplied to a high-pass filter and an ASC (Automatic Slice Control) circuit by which the fluctuation of voltage level at the edge portion is substantially suppressed. In order for such a method to successfully operate, the sum of the lengths of the marks and the sum of the lengths of the spaces included in the reproduction signal must be substantially the same. The difference between the respective totals of the lengths of the mark and space is called a DSV (Digital Sum Value). Thus, in order to realize a high-quality data reproduction, some measures are devised in the format of the optical disc during the recording of data in the optical disc medium that would allow the respective sums of the lengths of the marks and spaces are the same as much as possible. These methods are referred to as a DSV control or a DCC (DC Control).

For example, in DVDs, a string of data to be recorded is divided into periodic frames, and a sync pattern for synchronization is disposed at the head of each frame. A plurality of sync patterns are provided, and an encoder selects a sync pattern such that the DSV value can be close to zero as much as possible.

In the next-generation large-capacity optical discs, after the user data to be recorded is subjected to a scramble process and provided with an error correction code (ECC), the data is periodically divided and then a DCC bit (DSV control bit) is added. The value of the DCC bit is selected between "0" and "1" so that the DSV value approaches zero as much as possible. If the user data to be recorded is the same, the same signal is recorded in the optical disc medium.

When making the selection such that the DSV value approaches zero, there are cases where the absolute values of the DSV value are identical when the DCC bit is "0" and "1". In such cases, as the DSV value does not change logically regardless of which value of the DCC bit is selected, the encoder is operated to select either one (normally "0"). As mentioned above, if the number of possible rewrites is to be increased, it is preferable to record different signals in the optical disc medium even in a case where the same user data is recorded. In the case of the 17PP modulation code, since the information is located at edges, as in DVDs, the recorded signal can employ the polarity reversal technique. Further, the 17PP code has the feature that the number of edges in data prior to modulation and that in data after modulation is the same. This is an advantageous feature for performing a successful DSV control.

Based on the above-described presumptions, a recording method for achieving the aforementioned object of the invention is summarized below.

(1) In cases where the absolute values of the DSV value is identical between the case where the DCC bit is "0" and where the DCC bit is "1", the selection of the DCC bit is performed randomly. In this way, the number of edges in the data string that is recorded in the optical disc medium can be changed by one due to the characteristics of the 17PP code, so that the polarity of the data string following the DCC bit can be reversed.

(2) The above cases are expanded, and upper-limit conditions are quantified in advance below which the deterioration of the reproduction signal due to DSV is sufficiently small. Then, the selection of the DCC bit is randomly conducted within the range where the absolute value of the DSV value is below this upper-limit value (to be hereafter referred to as "a |DSV| threshold value"). In this way, there would be more opportunities for selecting the DCC bit in a random fashion, so that the polarity reversal can be performed in smaller units.

(3) In addition to the above two cases, whether the head of recording is a mark or a space is randomly selected. In this way, the polarity of the entire data recorded in the optical disc can be made random even in cases where there is only a small number of opportunities for randomly selecting the DCC bit, thereby increasing the number of possible rewrites.

FIG. 2 shows the results of calculation of the difference in the DCC bit and in the positions of the data and edges recorded in an optical disc medium as the |DSV| threshold value and the conditions for the priority selection of the DCC bit were changed. In the present example, the interval of DCC bits was 46 bit which is referred to as a DCC unit, and the calculations were based on a data string consisting of 13888 DCC units. The head data starts with a space. In the figure, Case No. 1 shows the aforementioned conventional case, while Nos. 2 to 8 show the features (1) and (2) according to the present invention. In the figure, "Difference in Data String" shows the percentage ratio of the difference in bits from Case No. 1 to the entire data strings when the marks of the data string recorded in the optical disc medium were "1" and the spaces were "0". "Difference in Edge Position" similarly shows the ratio of the difference in the position of the marks and spaces from Case No. 1.

Case No. 2 involves the feature (1) of the present invention, where the |DSV| threshold value is zero and the priority selection of the DCC bit is "1". Thus, the difference of 27% in DCC bit shows that the probability of the absolute values of the DSV value being equal is 27%. In this case, since the number of edges increases or decreases by one in each DCC unit, a polarity reversal can be produced, so that, as a result, the "Difference in Data Sequence" can be made approximately 50%. In this case, the "Difference in Edge Position" is 0.7%, which shows that there is only a polarity reversal and virtually nothing else is taking place. By performing this selection on a DCC bit basis in a random manner, a different signal can be recorded on the optical disc medium for each rewrite for the same user data, so that the number of possible rewrites can be increased.

Cases 3 to 8 involve the feature (2) of the present invention. When the |DSV| threshold value is increased from 10, 20, to 50, the difference in DCC bit increases up to approximately 50% and it saturates thereafter. "Difference in Data String" is constant at approximately 50%. Although "Difference in Edge Position" slightly increases up to 1.5%, there is mainly a polarity reversal that is taking place all the same. In this way, since the difference in DCC bit increases as compared to the aforementioned case, the degree of freedom increases in the case where the selection is randomly made. As a result, it becomes possible to record a more different signal on the optical disc medium in each rewrite for the same user data than in possible in the above-described case.

The feature (3) of the present invention will be described. In the figure, the head data is assumed to start with a space. In Case No. 1, when the head data is assumed to start with a mark, although there is no change in the DCC bit and the edge position, the data is completely reversed such that "Difference in Data String" is 100%. In the features (1) and (2) of the invention, the difference in DCC bit is up to 50%, so that not all of the DCC bit can be randomly selected. Thus, by incorporating an auxiliary means for randomly selecting a mark or a space in the head data, it becomes possible to obtain an effectively similar effect to the case where all of the DCC bits are randomly selected.

The recording apparatus provided by the present invention is an optical disc apparatus in which an encoder LSI capable of converting user data into a data string recorded on the optical disc medium is provided with the features (1) to (3) as described above are added.

For the understanding of the invention, the arrangement of the DCC bit and a region for the calculation of the DSV value will be described with reference made to FIG. 10. In the figure, user data consists of an n-byte stream of which the values are all "00h". If such a data stream is directly modulated, the data recorded on the disc would consist of a repetition of the same pattern, such that the DC component would not be easily suppressed by a HPF (High Pass Filter), for example, and a reproduction error would be more likely to occur. Therefore, a scramble process is conducted based on an appropriate rule. In the illustrated example, the simplest process of adding a byte position value is carried out. In the case where such a scramble process is performed, an inverse conversion is performed upon reproduction to restore the original data in a process called descrambling. To the scrambled data stream, an m-byte EDC (Error Detection Code) for error check and a k-byte ECC (Error Correcting Code) for error correction are added.

These are well known as Read-Solomon codes, and since they handle data in byte units, they are robust against burst error in a byte. In general, m is in many cases smaller than n by a factor of 100 or more and k is in many cases approximately one tenth to one twentieth the magnitude of n. Then, the ECC data stream is divided at (M-1) bit intervals, and a DCC bit is inserted between the bits. It should be noted that in the illustrated example, the data is handled on a bit-by-bit basis. The M-bit data string in which the DCC bit is inserted is called a DCC unit. In the illustrated example, the total number of DCC units is j. When these units are modulated in accordance with the 17pp modulation rule, the total number of bits is multiplied by $\frac{3}{2}$, and these units then constitute the data stream that is recorded on the optical disc.

With reference to FIG. 11, a method of calculating DSV and a method of selecting the DCC bit are described. In the illustrated example, SYNC data is added in the initial DCC unit so that it is closer to an actual optical disc signal. The influence a single DCC bit has on modulated data reaches up to the next DCC bit. In order to determine the DCC bit in a DCC unit 0, the DCC unit 0 and the next DCC unit are modulated and the DSV value of each is calculated, and then a DSV value with a smaller absolute value is selected. By repeating this process, the values of all of the DCC bits can be determined.

In order to specifically measure the relationship between the value of a |DSV| threshold and the quality of the reproduction signal, data was recorded on a prototype disc and then the reproduction jitter was measured. The head used was of the wavelength of 405 nm, and the objective lens had a numerical aperture of 0.85. The thickness of the cover layer in the disc was 100 μm, and the recording film was made of a GeSbTe alloy film. As a condition for generating the data string to be recorded, M-sequence random numbers were used for the selection of the DCC bit. The head of the recording data was fixed to a space. Recording conditions were such that the detection window width was 80 nm and the disc was rotated at the linear velocity of 5.28 m/s. The quality of the reproduction signal was evaluated on the basis of the jitter value. Specifically, the reproduction signal was passed through a high-pass filter with a cut-off frequency of 20 kHz and then subjected to an equalization process in a limit equalizer, and then the jitter at the edge of data and the clock was measured using a jitter analyzer. FIG. 5 shows the result of an experiment, indicating the relationship between the |DSV| threshold and jitter. As shown, when the |DSV| threshold is zero, the jitter value is 4.6%. As the |DSV| value is increased, the jitter value increases. The jitter saturates at 5.5% when the |DSV| value is 50 or more, representing an increase of approximately 1%. Generally, when the jitter value is 10% or less, basically no reproduction bit error occurs. It was learned that if a condition was adopted that the increase in jitter should not be more than 0.3% as a reference of the quality of the reproduction signal, the upper limit of the |DSV| threshold was 20. It can be said that there is no deterioration in the quality of the reproduction signal below this range.

The grounds on which the condition of 0.3% or less of the increase in jitter is based is explained. FIG. 9 shows variations of the jitter value along the peripheral measurement positions of a commercially available Blu-ray disc. Although variations occur in the jitter value along the circumferential direction due to the thickness variations of the recording film and the tilting of the disc, the amount of such fluctuations is of the order of 0.3%, which should be tolerated in drive apparatus. For this reason, the upper limit of the |DSV| threshold was determined to be within an increase of 0.3% of the jitter value.

FIG. 6 shows the result of measurement of the rewrite life of the prototype disc. The same user data was recorded continually starting from the same position of the prototype disc as the head, and then the jitter of the reproduction signal was measured. In the figure, "Prior Art" corresponds to Case No. 1 shown in FIG. 2 where the same data string was recorded on the disc continually. The result indicated "Invention" corresponds to Case No. 2 of FIG. 2 where the |DSV| threshold was 20 and where the selection of a mark or a space at the head portion and the selection of the DCC bit were made using random numbers. Assuming that a good signal recording and reproduction can be performed with the condition that the jitter value is 10% or less, the result shows that about 5000 rewrites can be performed by the prior art method and about 50,000 rewrites can be performed by the method of the invention, thus indicating a significant improvement in the number of possible rewrites according to the invention.

A method of recording content protective information using a simple means will now be described. This method utilizes a part of the DCC bit. In the above-described example, the number of the DCC bits can be decreased by 10% and still the |DSV| threshold of 20 can be satisfied. Therefore, content protective information can be recorded in the DCC bit at a predetermined position without adversely affecting the DSV value.

In accordance with the recording method and apparatus provided by the invention, the jitter can be reduced and the number of possible rewrites can be increased.

BRIEF DESCRIPTION OF THE DRAWINGS

FIG. 2 shows the results of changing a |DSV| threshold and the conditions for preferential selection of a DCC bit.

DESCRIPTION OF THE PREFERRED EMBODIMENTS

The invention will now be described in detail by way of embodiments thereof.

Embodiment 1

Figure 1:
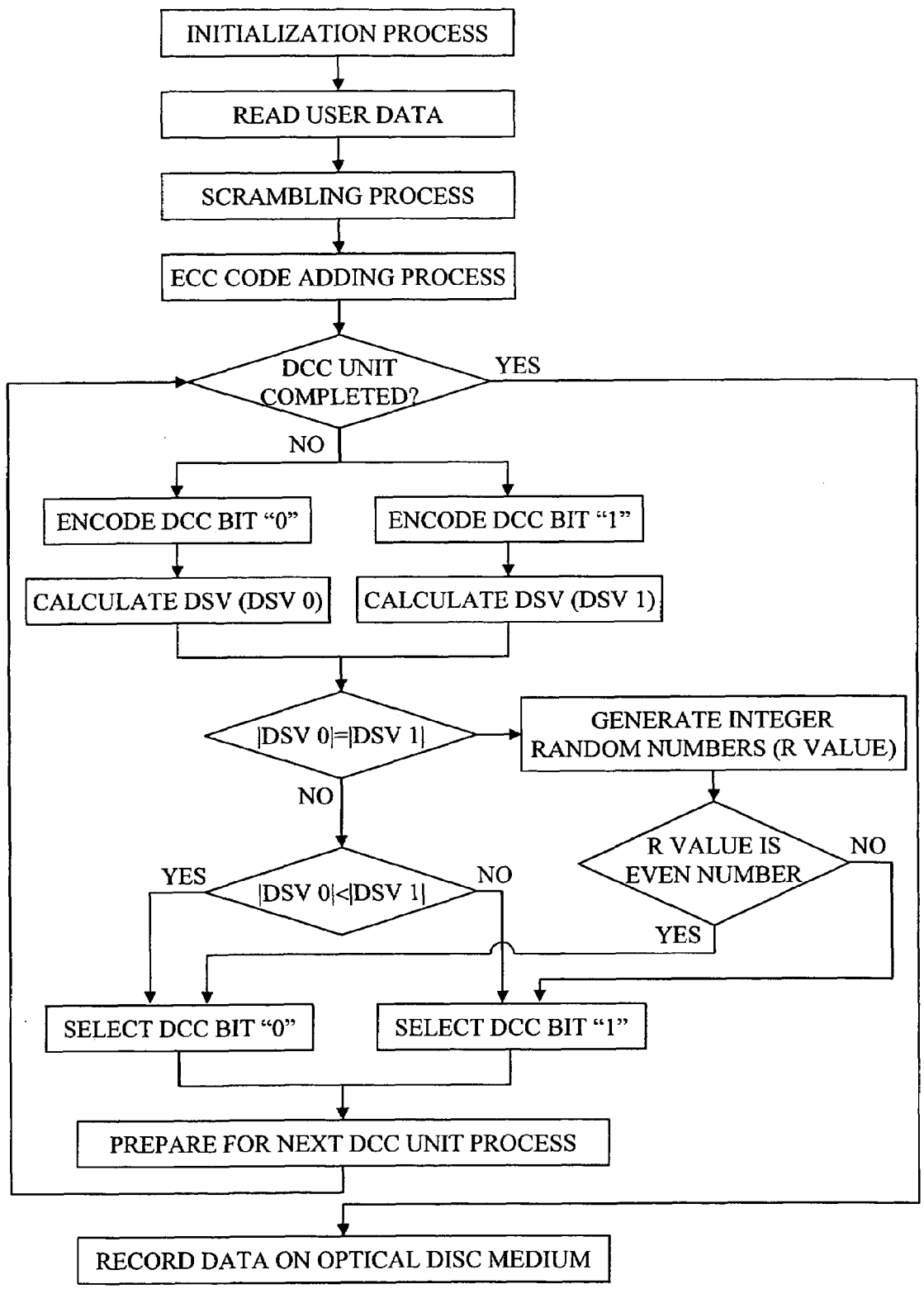
FIG. 1 shows an embodiment of a recording method according to the invention.

Embodiment 1 concerns an example of a recording method according to the invention. FIG. 1 shows a flowchart of the recording method of the invention. First, an initialization process is carried out whereby a data string corresponding to a DCC bit "0" and a DCC bit "1" and the DSV value are initialized. Then, user data is read, followed by a scramble process and a process to add an ECC code, which completes preparations.

The DSV value in the data string in each DCC unit is calculated, and then a loop is carried out according to a predetermined method to select "0" or "1" of the DCC bit. Initially, an encoding process is carried out for each of the cases where the DCC bit is "0" and "1". Then, the DSV value is calculated for each data string, thereby obtaining the values of DSV0 and DSV1. If the absolute values of DSV0 and DSV1 are equal, integer random numbers R are generated. When R is an even number, DCC bit "0" is selected, while when R is an odd number, DCC bit "1" is selected. If the absolute values of DSV0 and DSV1 are different, a DCC bit with a smaller absolute value of DSV is selected. Thus the selection of the DCC bit in a single DCC unit is completed. As preparations for the processing of a next DCC unit, the DSV values are made equal. For example, when the DCC bit "0" has been selected, the value of DSV0 is copied onto the value of DSV1.

Such processes are performed on all of the DCC units continuously, thereby carrying out the selection of all of the DCC bits and completing a recording data string for a single block. Finally, the data is recorded on the optical disc medium and the procedure comes to an end.

Figure 3:
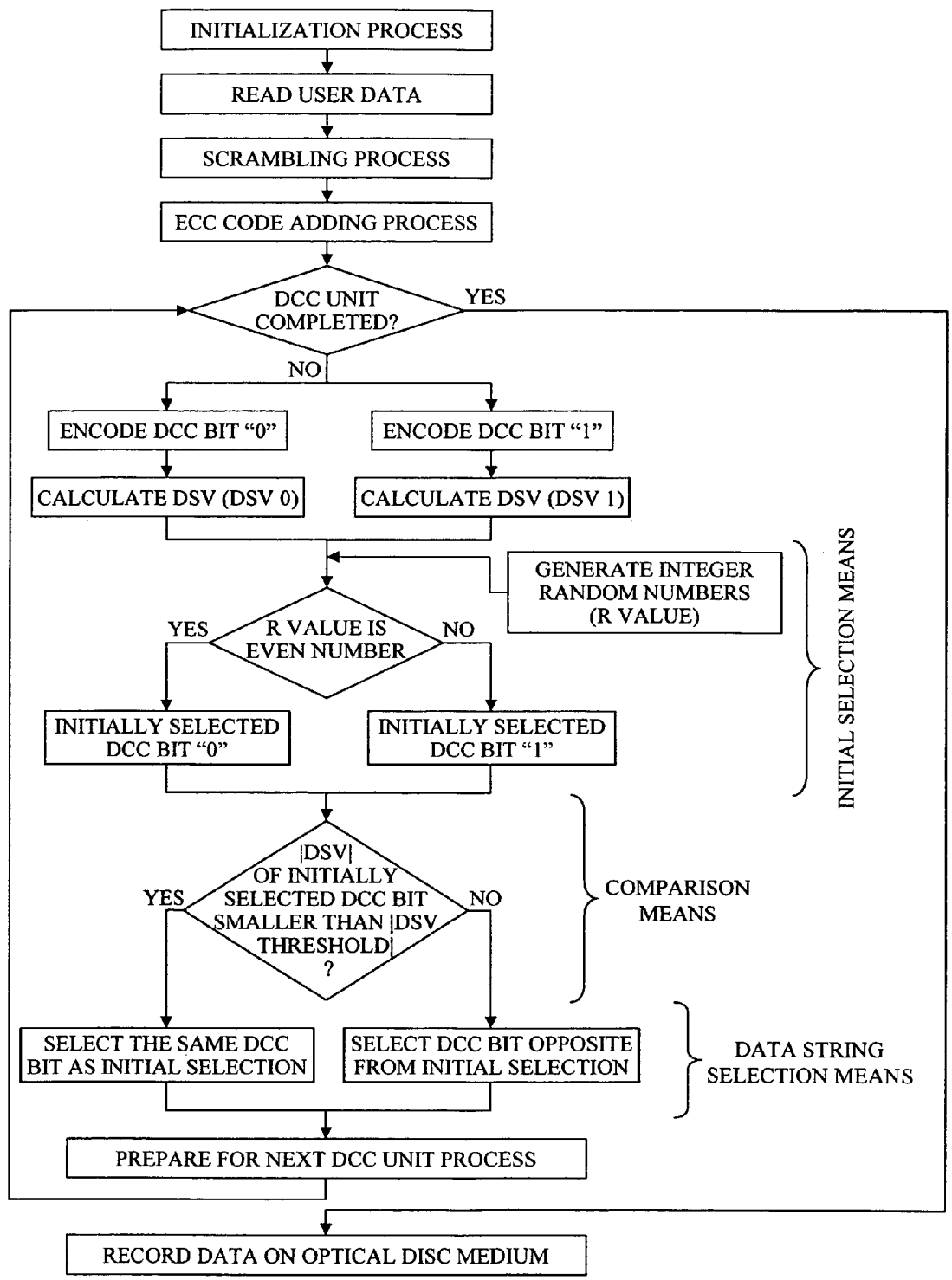
FIG. 3 shows another embodiment of the recording method according to the invention.

FIG. 3 shows a flowchart of another embodiment of the recording method of the invention. The processes from initialization to the calculation of the DSV value are the same as those of FIG. 1.

The selection of the DCC bit is carried out in a substantially random manner. Specifically, integer random numbers R are initially generated, and if R is an even number, the initial selection of the DCC bit is "0", while if R is an odd number, the initial selection of the DCC bit is "1". If the DSV value on the selected side is not more than a predetermined |DSV| threshold, the selection of the initial DCC bit is utilized as is. Otherwise, the DCC bit on the opposite side of the selection of the initial DCC bit is selected.

Figure 5:
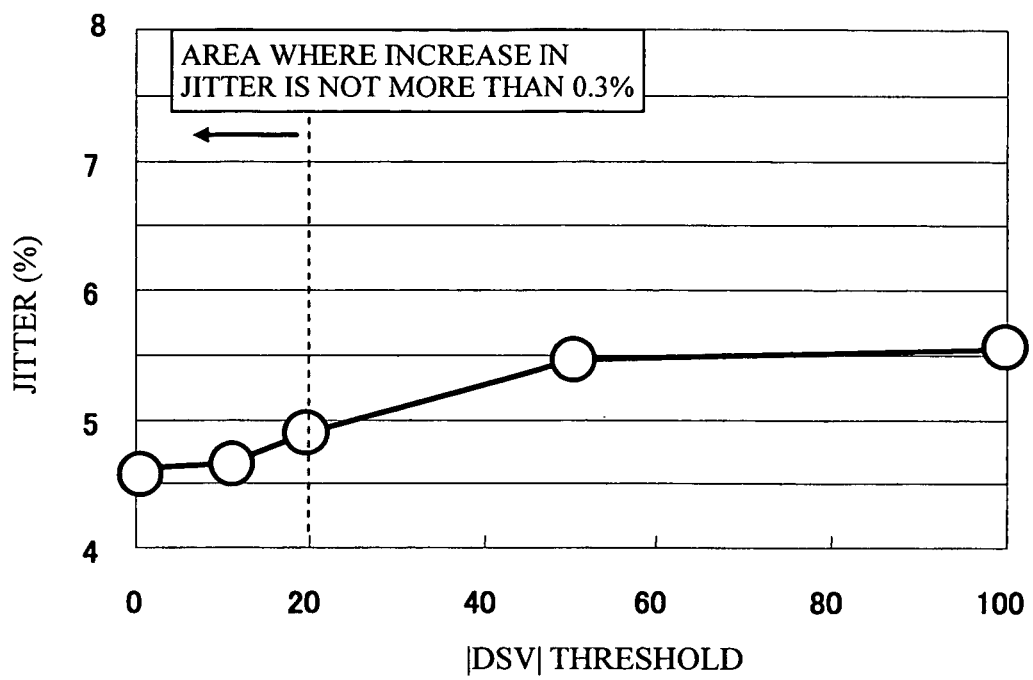
FIG. 5 shows the results of an experiment showing the relationship between the |DSV| threshold and jitter.

By thus utilizing the |DSV| threshold that is defined within such a range that the quality of the reproduction signal would not be affected, the degree of freedom in selecting the DCC bit can be increased, as shown in FIG. 2. As a result, a different data string can be recorded on the optical disc at each time, so that the number of possible rewrites can be increased. Preferably, the specific value of the |DSV| threshold should be not more than 20, as mentioned with reference to FIG. 5.

Embodiment 2

Figure 4:
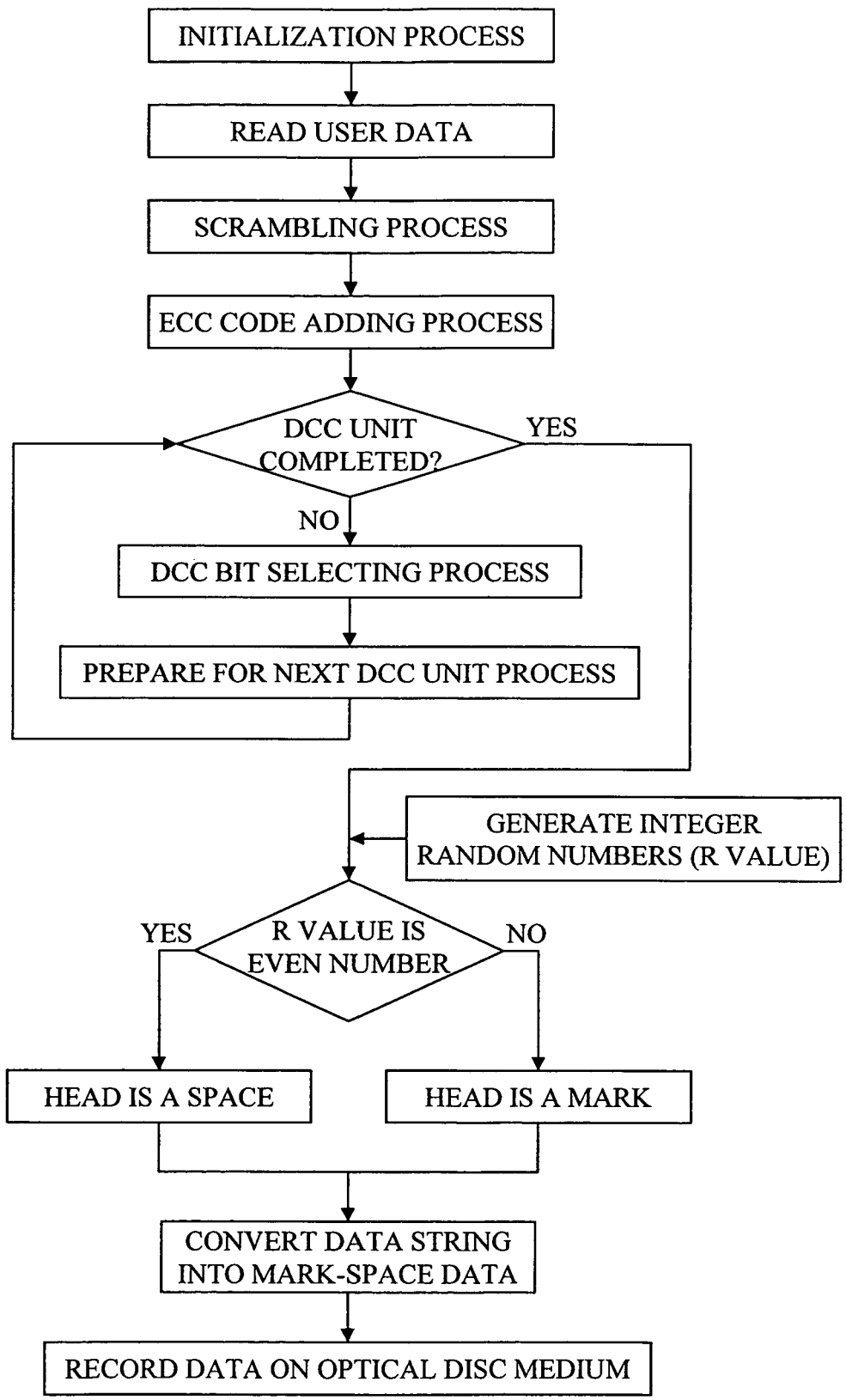
FIG. 4 shows another embodiment of the recording method according to the invention.

FIG. 4 shows a flowchart of another embodiment of the recording method of the invention. This flow is identical to that of the above-described embodiment as far as the initialization process and up to the ECC code-adding process are concerned. The process of selecting the DCC bit is in accord with the method described with reference to FIGS. 1 and 3 and is therefore not described herein to avoid redundancy. Although not having been specifically stated with reference to the above embodiment, since a 17PP code is an edge recording, the data string generated in the DCC bit selecting process is "edge data" with such a format that only the edge portions are "1" and the other portions are "0". In order to actually record information on an optical disc medium, the "edge data" must be converted into "mark-space data" in which the mark portions are "1" and the space portions are "0". In this case, there is a degree of freedom as to the selection of whether the head should be a mark or a space, as mentioned above. Therefore, integer random numbers R are generated, and if R is an even number, the head is selected in a substantially random manner such that the head is a space if R is an even number and a mark if an odd number. By thus making the selection of the head and utilizing the "edge data" obtained as described above, "mark-space data" can be easily and uniquely obtained. As a result, the mark-space polarity in the block as a whole can be reversed in a random fashion, and by utilizing this as an auxiliary means for the above-described embodiment, the number of possible rewrites can be further increased.

In the above descriptions, each selection was described to be carried out in the context where the random numbers were integers that were divided into cases of even and odd numbers for simplicity's sake. In fact, however, there is a variety of methods for generating random numbers. For example, one-bit random numbers may be used, or a shift register circuit of a type that feeds back the clock signal and the output, such as one used in a scrambling process, and yet the same effects can be obtained. The gist of the invention lies in the carrying out of the selection of whether the head is a mark or a space as well as the selection of the DCC bit in a substantially random fashion, and therefore use of the aforementioned methods fall within the scope of the invention.

Embodiment 3

Figure 12:
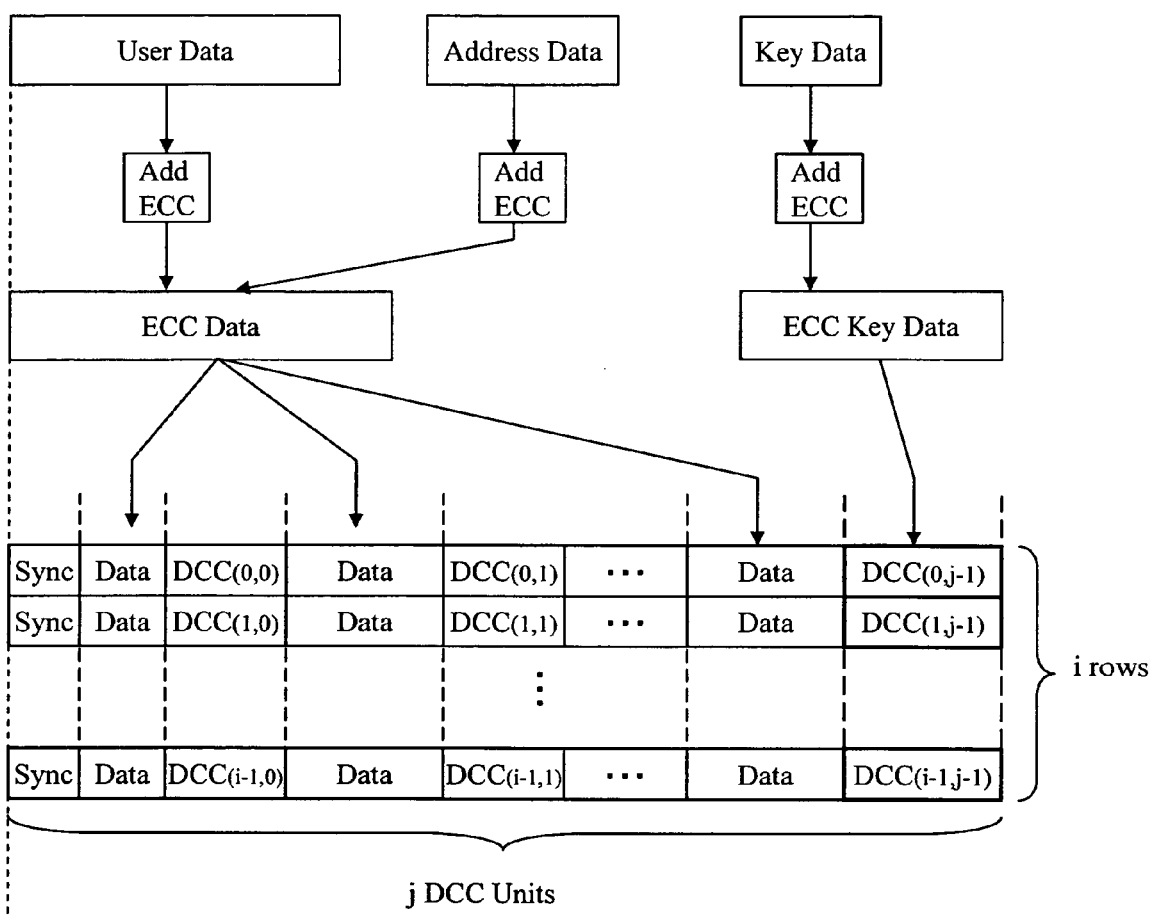
FIG. 12 shows an embodiment of a method of recording additional information in a DCC bit.

FIG. 12 shows another embodiment pertaining to a method of recording additional information in the DCC bit. This embodiment more closely approximates the signal in an actual optical disc, wherein address data is simultaneously recorded in addition to user data. Further, the DCC units are such that a SYNC pattern is embedded in each unit of a number j. The overall structure of the data stream is of a matrix type consisting of j columns of DCC units in i rows. The process flow of the user data is as described above. Address data is periodically inserted in the user data stream after ECC information is added, as in the case of the user data. Additional information, typically content protecting information, is stored in a DCC bit in the last column, preferably after carrying out the ECC process, as in the case of the other data strings. For example, in a case where the block data is 64 kB, the number of columns of the DCC units is 28, and the number of rows of the DCC units is 496, 496/8=62 bytes of information can be recorded. Since a highly sophisticated encryption-key data can be sufficiently stored using 8 bytes, by adding 32 bytes of ECC data to 30 bytes of data in order to ensure reliability, the probability with which the additional information can be ECC-corrected can be increased even if the user data cannot be ECC-corrected.

Embodiment 4

A recording apparatus according to the invention will now be described by way of an embodiment.

Figure 7:
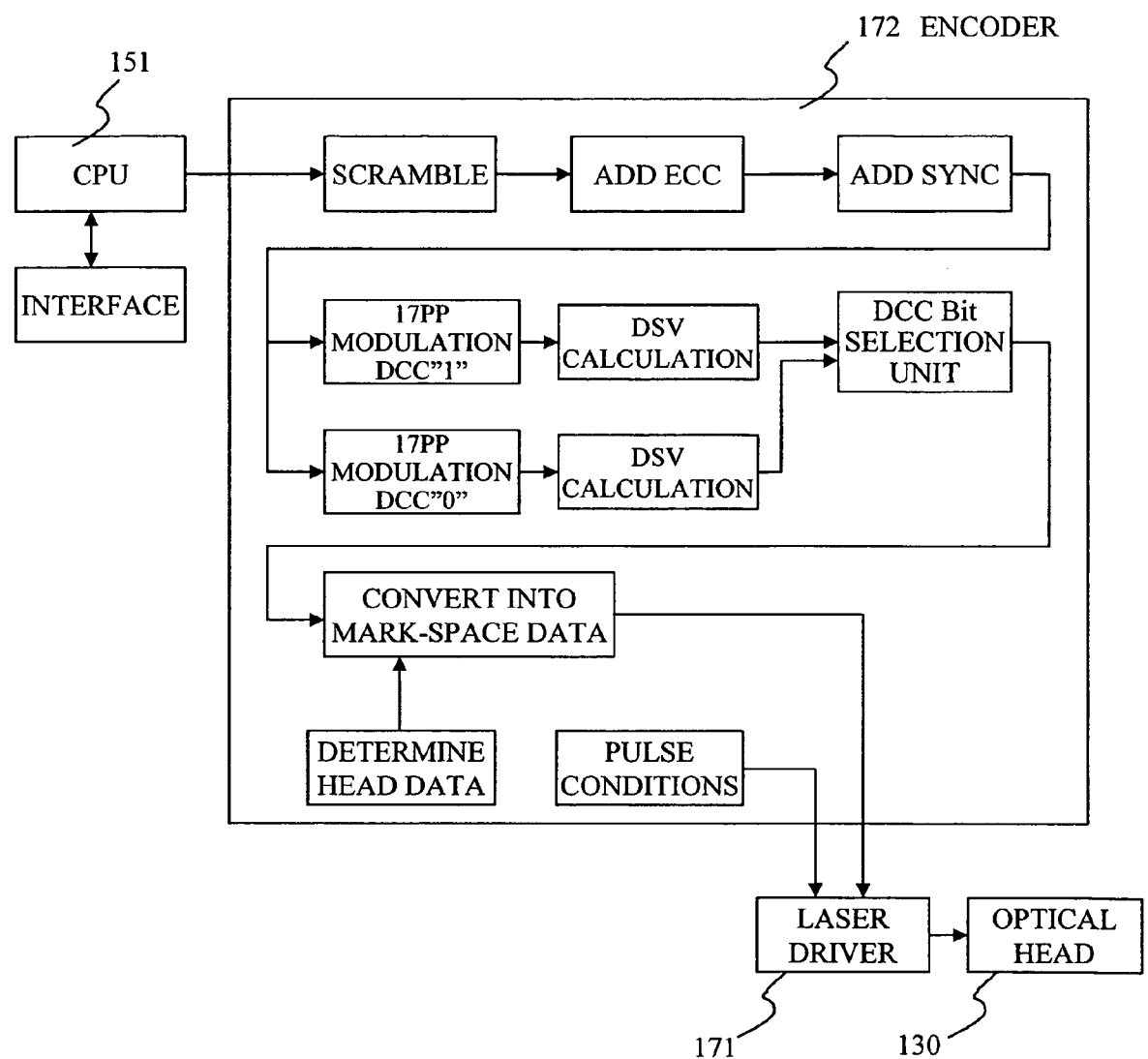
FIG. 7 shows an embodiment of an encoder according to the invention.

FIG. 7 shows a circuit block diagram of an encoder as a feature of the recording apparatus of the invention. Constituent elements necessary for the recording of data include CPU 151, an encoder 172, a laser driver 171, and an optical head 130. The invention is characterized by the encoder 172, which receives data sent from an interface via CPU 151 and then, prior to the DDC bit selection process, carries out the scrambling process, ECC-adding process, and SYNC-adding process in that order. While there have been no description in Embodiment 1 with regard to the SYNC information, it is necessary to add a SYNC bit string at the head of a plurality of DCC units as a whole, in order to indicate the position information about the head. As to the DCC bit selection process, after carrying out the 17PP modulation process and the DSV calculation process for each of the cases where the DCC bit is "0" and "1", the selection process is carried out in the DCC bit selection portion in accordance with the method described with reference to Embodiment 1. The function for randomizing the selection of the DCC bit is carried out here. Thereafter, the "edge data" is converted into "mark-space data", which is then transmitted to a laser driver, together with light pulse conditions. The laser driver 171 controls the current that is caused to flow in a blue semiconductor laser in the optical head 130 such that the data is recorded on the optical disc medium with a predetermined power and under the predetermined pulse conditions. The randomization of the head data as shown in FIG. 4 is carried out during the conversion into the "mark-space data".

Figure 8:
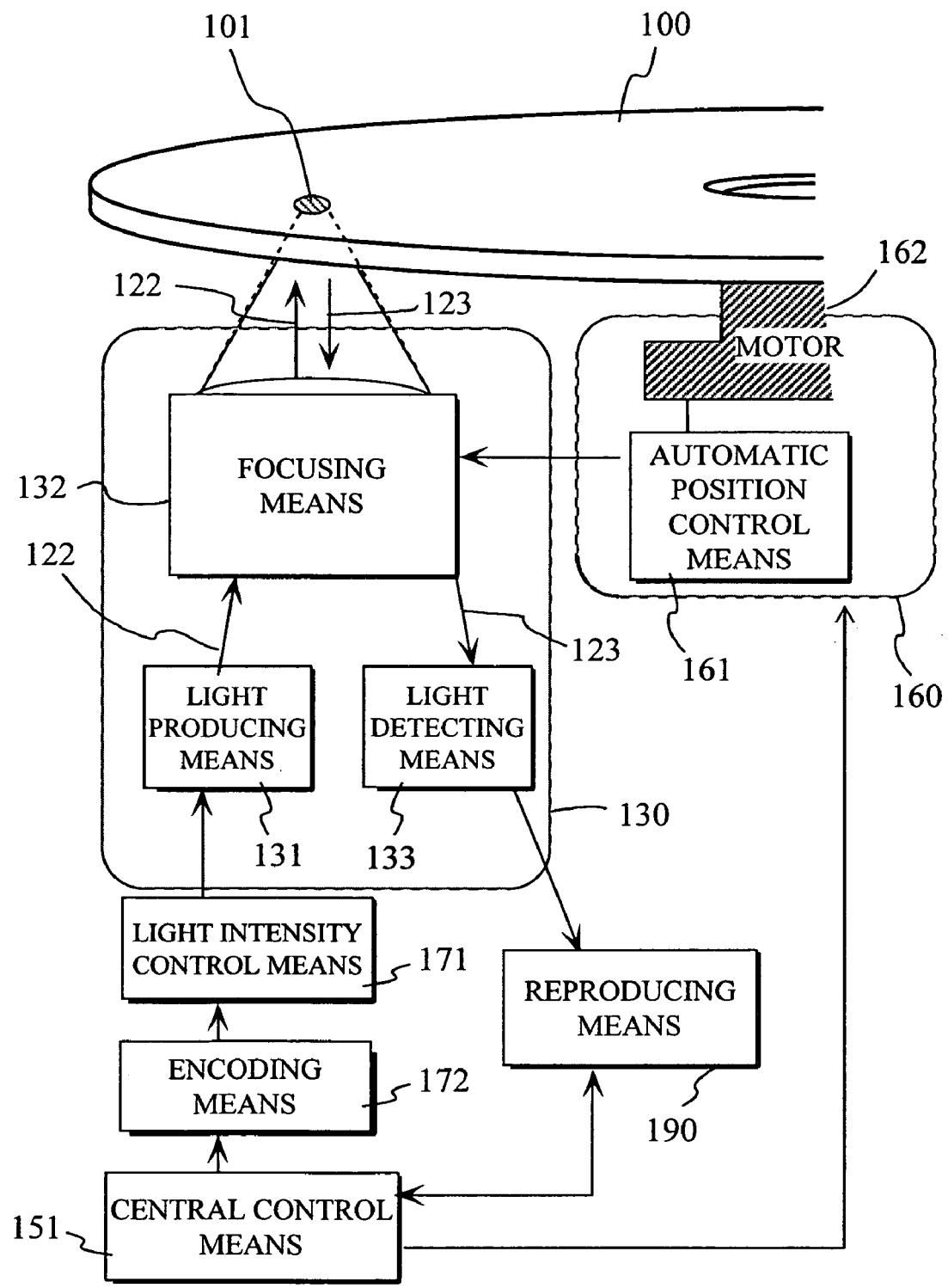
FIG. 8 shows an embodiment of a recording apparatus according to the invention.
Figure 9:
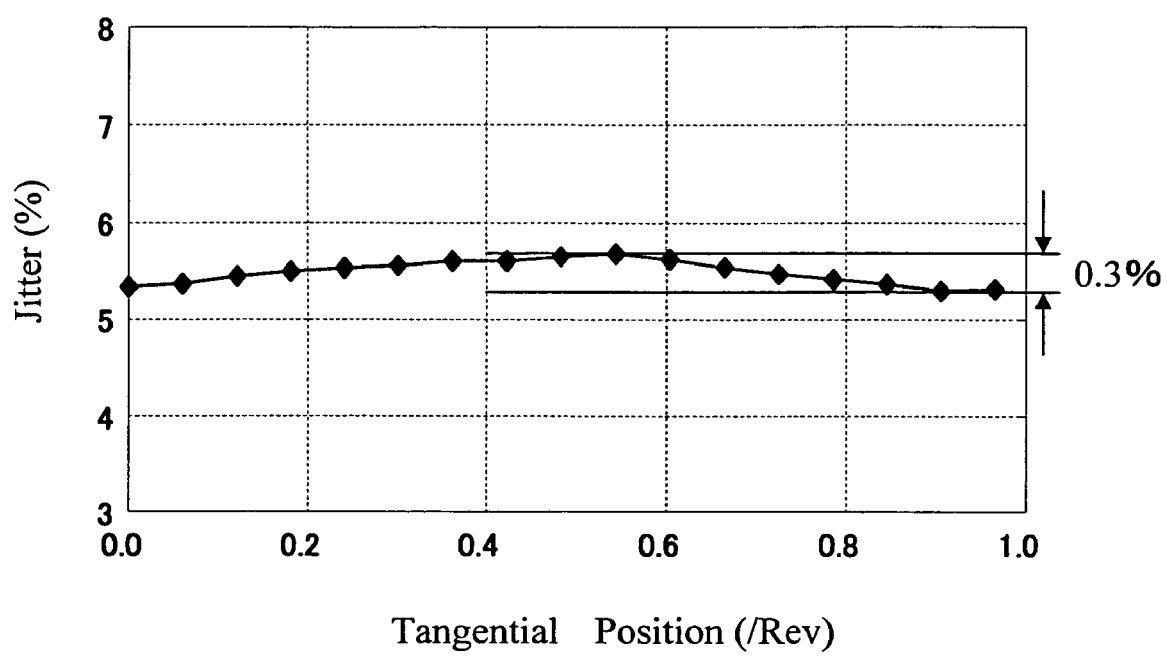
FIG. 9 shows the results of measurement showing the distribution of jitter value in a circumferential direction of a disc.
Figure 10:
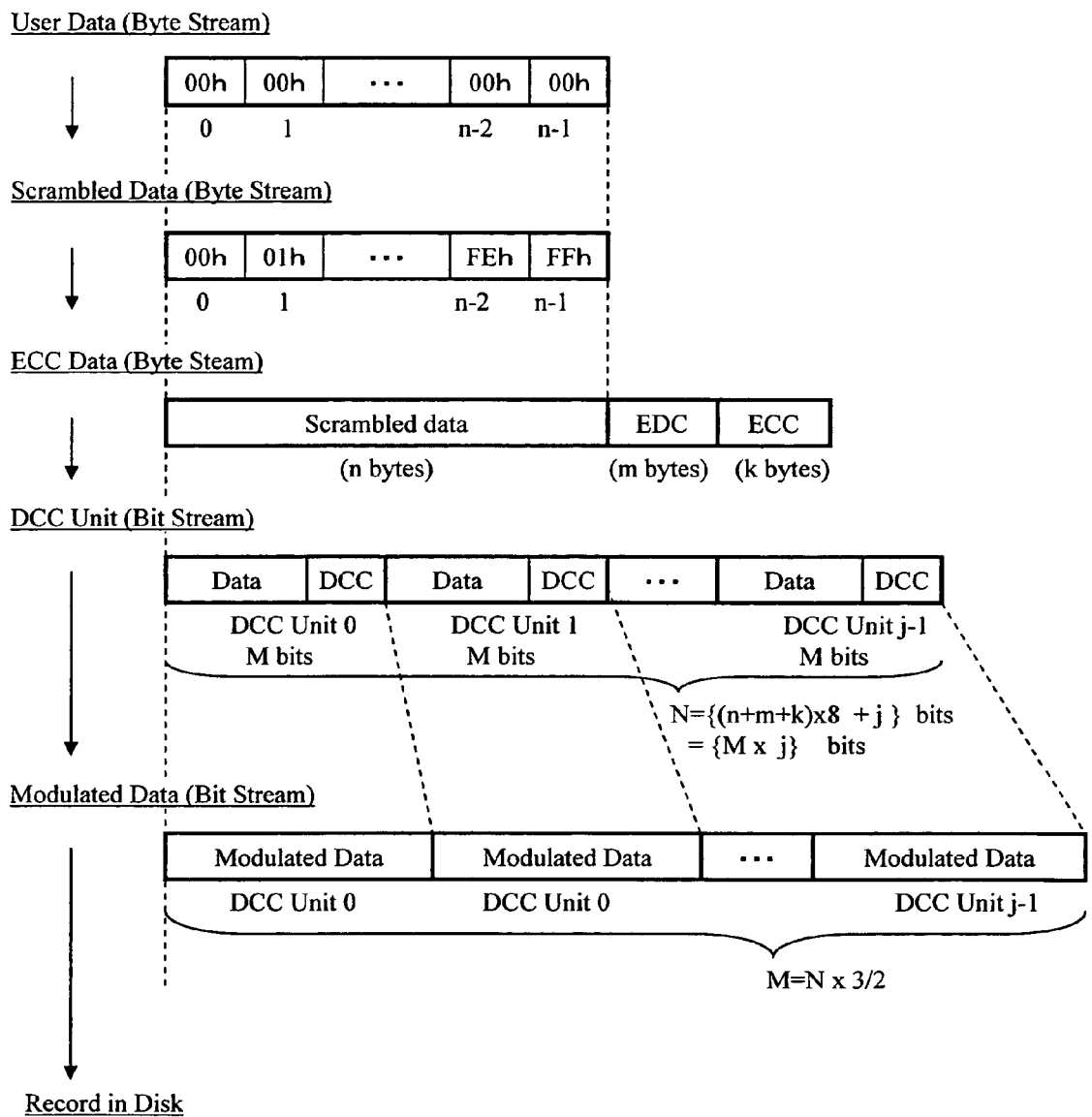
FIG. 10 schematically shows the arrangement of DCC bits.
Figure 11:
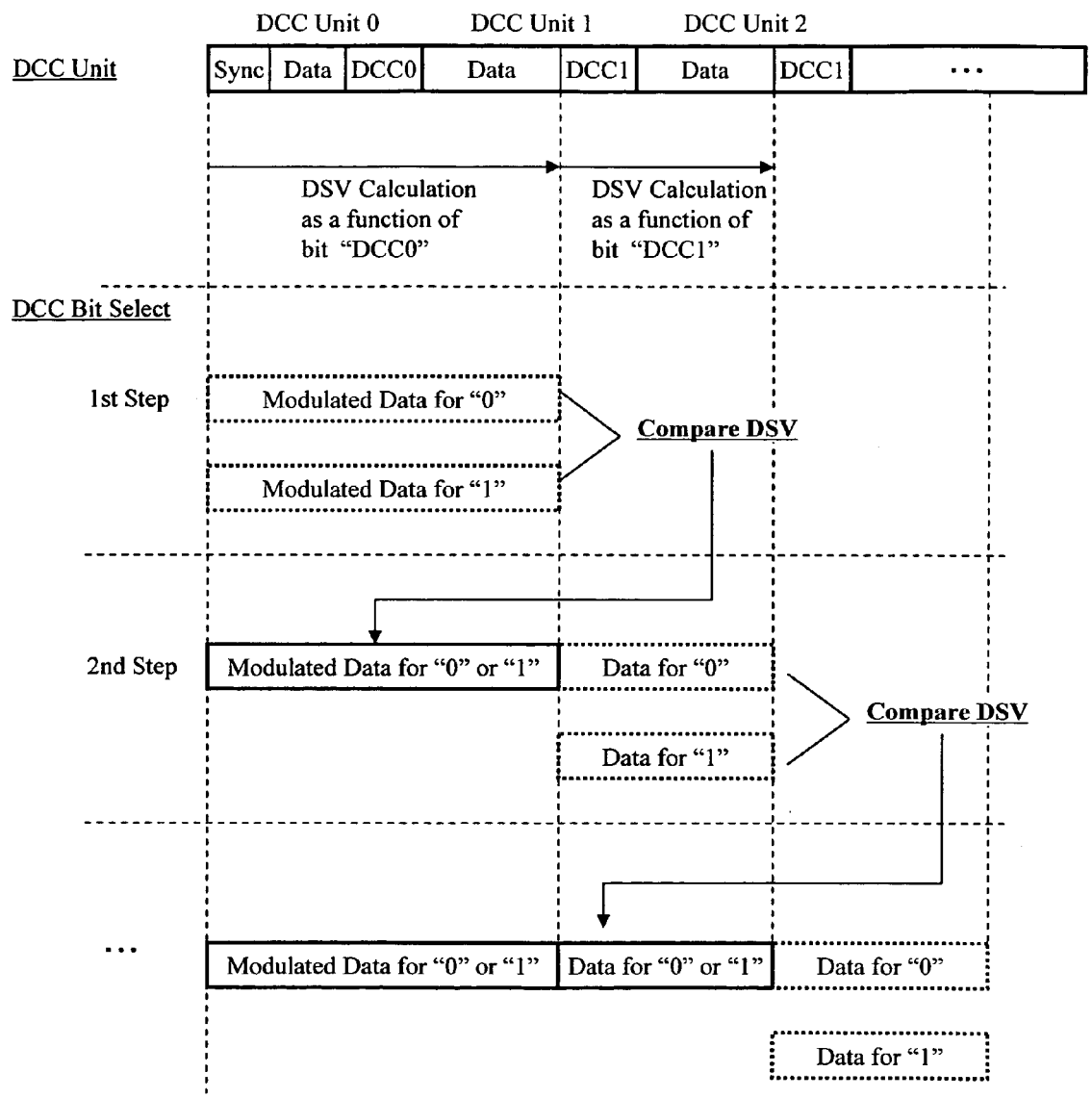
FIG. 11 schematically shows a DSV calculation region and a method of selecting the DCC bit.

FIG. 8 shows an example of the recording apparatus according to the invention. An optical disc medium 100 is rotated by a motor 162. An optical head 130 is comprised of a light producing means 131, a focusing means 132, and a light detecting means 133. The optical disc medium 100 is radially positioned as desired by an automatic position control means 161 provided within a servo mechanism control means 160. A light intensity control means 171 controls the light producing means 131 such that light 121 is produced that has a light intensity instructed from a central control means 151. The light 122 is focused by the focusing means 132 such that a light spot 101 is formed on the optical disc medium 100. The focusing means 132 carries out a focusing operation and a tracking operation under the control of the automatic position control means 161. Reflected light 123 from the light spot 101 is converted into an electric signal in a light detection means 133, and the signal is sent to a reproduction means 190. The reproduction means 190 reproduces the code information, address information and so on recorded on the optical disc medium. Constituent elements necessary for the recording of the aforementioned data are a central control means 151, an encoding means 172 for controlling the optical beam conditions, the light intensity control means 171, and the light producing means 131, which is the light source in the optical head 130. The details of the structure and operation of the encoding means 172 are as described with reference to FIG. 7.

Figure 6:
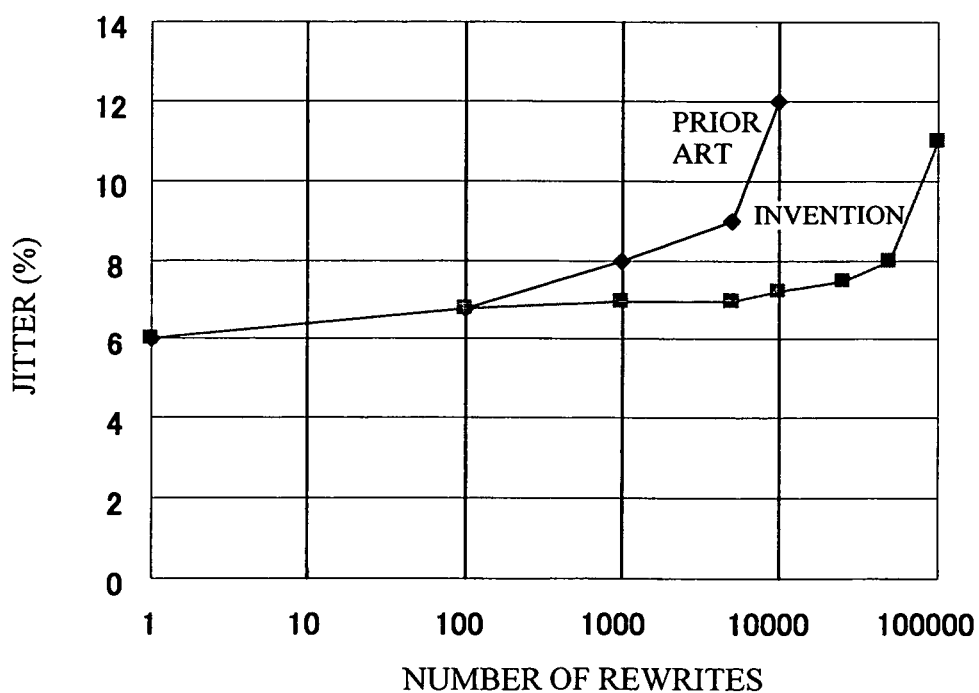
FIG. 6 shows the results of measurement of the rewrite life of a prototype disc.

By using the recording apparatus of the invention, the signal recorded on an optical disc can be changed in each case, so that the number of possible rewrites can be significantly increased, as shown in FIG. 6.

Further, the functions for adding additional information to the DCC bit and reproducing the additional information from the signal recorded on the optical disc medium can be easily realized by utilizing the above-described method in the relevant circuit. These functions can be built inside the reproduction means 190.

The present invention is used in large-capacity optical disc apparatuses that utilize phase-change materials.

What is claimed is:

1. An information recording method for recording information on Blu-ray disc using an RLL (1,7) encoding rule, wherein a data string in which a DSV control bit for controlling DSV is periodically inserted is generated in recording data, said method comprising:

generating a first and a second data string by modulating said data string for the case where said DSV control bit is "0" and the case where said DSV control bit is "1", respectively, using in each case said RLL (1,7) encoding rule;

selecting said first or said second data string in a substantially random manner; and recording one of the data strings thus selected on said Blu-ray disc when the absolute value of DSV of the one data string thus selected is smaller than a predetermined DSV absolute value.

2. The recording method according to claim 1, wherein the other data string that has not been selected is recorded on said Blu-ray disc when the DSV absolute value of the one data string that has been selected is larger than the predetermined DSV absolute value.

3. The recording method according to claim 1, wherein said predetermined DSV absolute value is not more than 50.

4. The recording method according to claim 1, wherein said predetermined DSV absolute value is not more than 20.

5. The recording method according to claim 1, wherein said DSV control bit has additional Information added thereto.

6. The recording method according to claim 1, wherein a mark or a space is selected in a substantially random manner as the head of the data string that is recorded on said Blu-ray disc.

7. A recording apparatus comprising: a light source for irradiating Blu-ray disc medium with a light beam; and an encoder for controlling a condition of said optical beam, wherein said encoder comprises:

means for generating, in accordance with an RLL (1,7) encoding rule, a first data string for the case where a DSV control bit that is periodically inserted in a recording data string for a DSV control is "0";

means for generating a second data string for the case where the DSV control bit is "1";

means for calculating a first DSV value for said first data string;

means for calculating a second DSV value for said second data string; and selection means for selecting either said first or said second data string based on at least either said first or said second DSV value.

8. The recording apparatus according to claim 7, wherein said selection means compares the absolute values of said first and second DSV values, and then selects said first or said second data string.

9. The recording apparatus according to claim 7, wherein said selection means selects said first or said second data string in a substantially random manner when the absolute values of said first and said DSV values are equal.

10. The recording apparatus according to claim 7, wherein said selection means comprises:

initial selection means for initially selecting said first or said second data string in a substantially random manner, comparison means for comparing the DSV absolute value of one of the data strings that has been initially selected with a predetermined DSV absolute value; and means for selecting one of the data strings that has been Initially selected when the DSV absolute value of the one data string initially selected is not more than said predetermined DSV absolute value.

11. The recording apparatus according to claim 7, wherein said selection means comprises means for selecting the other data string that has not been initially selected when the absolute value of DSV of the one data string initially selected is larger than said predetermined DSV absolute value.

12. The recording apparatus according to claim 7, wherein said encoder further comprises means for selecting either a mark or a space in a substantially random manner as the head of the data string recorded on said Blu-ray disc.

13. The recording apparatus according to claim 7, wherein a highly sophisticated encryption key data Is stored in the first data string and the second data string.

* * * * *